United States Patent
Tsien

(10) Patent No.: US 7,640,401 B2
(45) Date of Patent: Dec. 29, 2009

(54) REMOTE HIT PREDICTOR

(75) Inventor: Benjamin Tsien, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 450 days.

(21) Appl. No.: 11/691,007

(22) Filed: Mar. 26, 2007

(65) Prior Publication Data

US 2008/0243739 A1   Oct. 2, 2008

(51) Int. Cl.
G06F 12/00 (2006.01)

(52) U.S. Cl. .................. 711/141; 711/144; 711/146; 711/156

(58) Field of Classification Search ............ 711/141, 711/144, 146, 156
See application file for complete search history.

(56) References Cited

U.S. PATENT DOCUMENTS

| | | | |
|---|---|---|---|
| 6,631,401 B1 | 10/2003 | Keller et al. | |
| 6,757,793 B1 | 6/2004 | Hughes et al. | |
| 6,973,543 B1 | 12/2005 | Hughes | |
| 7,103,725 B2 * | 9/2006 | Glasco | 711/141 |
| 7,107,408 B2 * | 9/2006 | Glasco | 711/141 |
| 7,225,298 B2 * | 5/2007 | Cypher | 711/141 |
| 7,240,165 B2 * | 7/2007 | Tierney et al. | 711/144 |
| 7,360,029 B2 * | 4/2008 | Landin et al. | 711/141 |
| 7,360,032 B2 * | 4/2008 | Cantin et al. | 711/141 |
| 7,395,376 B2 * | 7/2008 | Cantin et al. | 711/141 |
| 2004/0260889 A1 * | 12/2004 | Cypher | 711/148 |
| 2005/0160430 A1 * | 7/2005 | Steely et al. | 719/310 |
| 2005/0240734 A1 | 10/2005 | Batson et al. | |
| 2005/0262250 A1 | 11/2005 | Batson et al. | |
| 2006/0277369 A1 | 12/2006 | Tsien | |
| 2006/0282645 A1 | 12/2006 | Tsien | |
| 2006/0288171 A1 | 12/2006 | Tsien | |
| 2007/0033347 A1 | 2/2007 | Tsien | |

OTHER PUBLICATIONS

Cutsem et al., "The Opteron Microprocessor," pp. 1-17, prog.vub.ac.be/~tvcutsem/publications/opteron03overview.pdf, tvcutsem@vub.ac.be, Nov. 30, 2003.*
White Paper HTC_WP03, "HyperTransport I/O Technology DirectPacket™ Specification: Efficient User Packet Handling Supports Streaming Communications," pp. 1-20, www.hypertransport.org, Jun. 2004.*
White Paper HTC_WP02, "HyperTransport™ I/O Technology Overview: An Optimized, Low-latency Board-level Architecture," pp. 1-23, www.hypertransport.org, Jun. 2004.*
Tendler, et al., "Power4 System Microarchitecture", IBM J. Research and Development, vol. 46, No. 1, Jan. 2002, pp. 5-25.

* cited by examiner

Primary Examiner—Stephen C Elmore
(74) Attorney, Agent, or Firm—Lawrence J. Merkel; Meyertons, Hood, Kivlin, Kowert & Goetzel, P.C.

(57) ABSTRACT

In one embodiment, a first node comprises at least one memory request source and a node controller coupled to the memory request source. The node controller comprises a remote hit predictor configured to predict a second node to have a coherent copy of a block addressed by a memory request generated by the memory request source, and the node controller is configured to issued a speculative probe to the second node responsive to the prediction and to the memory request.

25 Claims, 6 Drawing Sheets

| Tag[47:6] | Local | ID | Spec Sent | No Predict |

50

REMOTE HIT PREDICTOR

BACKGROUND

1. Field of the Invention

This invention is related to computer systems and, more particularly, to maintaining cache coherence in computer systems.

2. Description of the Related Art

Computer systems have generally implemented one or more levels of cache to reduce memory latency. The caches are smaller, higher speed memories than the memory in the main memory system. Typically, caches store recently-used data. For example, caches are often implemented for processor access, and store data recently read/written by the processors in the computer systems. Caches are also sometimes implemented for other high speed devices in the computer system as well. In addition to storing recently-used data, caches can be used to store prefetched data that is expected to be used by the processor (or other device).

Caches store copies of data that is also stored in main memory. In multiprocessor systems, and even in single processor systems in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In the more common write-back cache, writes are made in the cache and not reflected in memory until the updated cache block is replaced in the cache (and written back to main memory by the cache). Writeback caches generally reduce the memory bandwidth consumed by writes, and thus are more popular.

Because the updates have not been made to main memory at the time the updates are made in cache, a given data consumer can read the copy of data in main memory and obtain "stale" data (data that has not yet been updated). Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write.

Cache coherence schemes create an overhead on memory read/write operations. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Thus, the overhead of the cache coherence scheme includes communications among the caches to maintain/update the coherence state. These communications can increase the latency of the memory read/write operations.

The overhead is dependent on the structure of the computer system. More specifically, the overhead depends on the form of interconnect between the various caches and data producers/consumers. In a shared bus system, snooping is often implemented to maintain coherence. A given memory request transmitted on the bus is captured by other caches, which check if a copy of the requested data is stored in the cache. The caches can update the state of their copies (and provide data, if the cache has the most up to date copy).

As the number of processors included in computer systems has grown, point to point interconnects have become more common. Point to point interconnects can typically be operated at higher frequencies than shared buses, since the electrical load on a given line is lower and often the line lengths are shorter. The aggregate bandwidth of the interconnect is generally higher. However, latency typically increases as well since communications may need to be routed through one or more intermediate nodes from source to destination. Additionally, since there is no common point of communication (like the shared bus), other mechanisms for providing a coherence point are implemented. For example, a home node is often assigned to each address in the memory address range, and coherence of the data corresponding to the address is coordinated by the home node. Typically, the home node also includes the memory locations that form the main memory for the addresses assigned to the home node. Communications with the home node can further increase the latency.

SUMMARY

In one embodiment, a first node comprises at least one memory request source and a node controller coupled to the memory request source. The node controller comprises a remote hit predictor configured to predict a second node to have a coherent copy of a block addressed by a memory request generated by the memory request source, and the node controller is configured to issue a speculative probe to the second node responsive to the prediction and to the memory request.

In an embodiment, a system comprises a plurality of nodes coupled via an interconnect. Each of the plurality of nodes comprises a remote hit predictor. A given node of the plurality of nodes, in response to a memory request to be issued from the given node, is configured to predict another node of the plurality of nodes to have a coherent copy of a block addressed by the memory request. The given node is configured to issue a speculative probe to the other node in response to the prediction.

In one embodiment, in a system comprising a plurality of nodes coupled via an interconnect, a method comprises predicting a first node of the plurality of nodes to have a coherent copy of a block addressed by a memory request, the predicting performed in a second node of the plurality of nodes that is initiating the memory request; and issuing a speculative probe from the second node to the first node.

BRIEF DESCRIPTION OF THE DRAWINGS

The following detailed description makes reference to the accompanying drawings, which are now briefly described.

Figure 1:
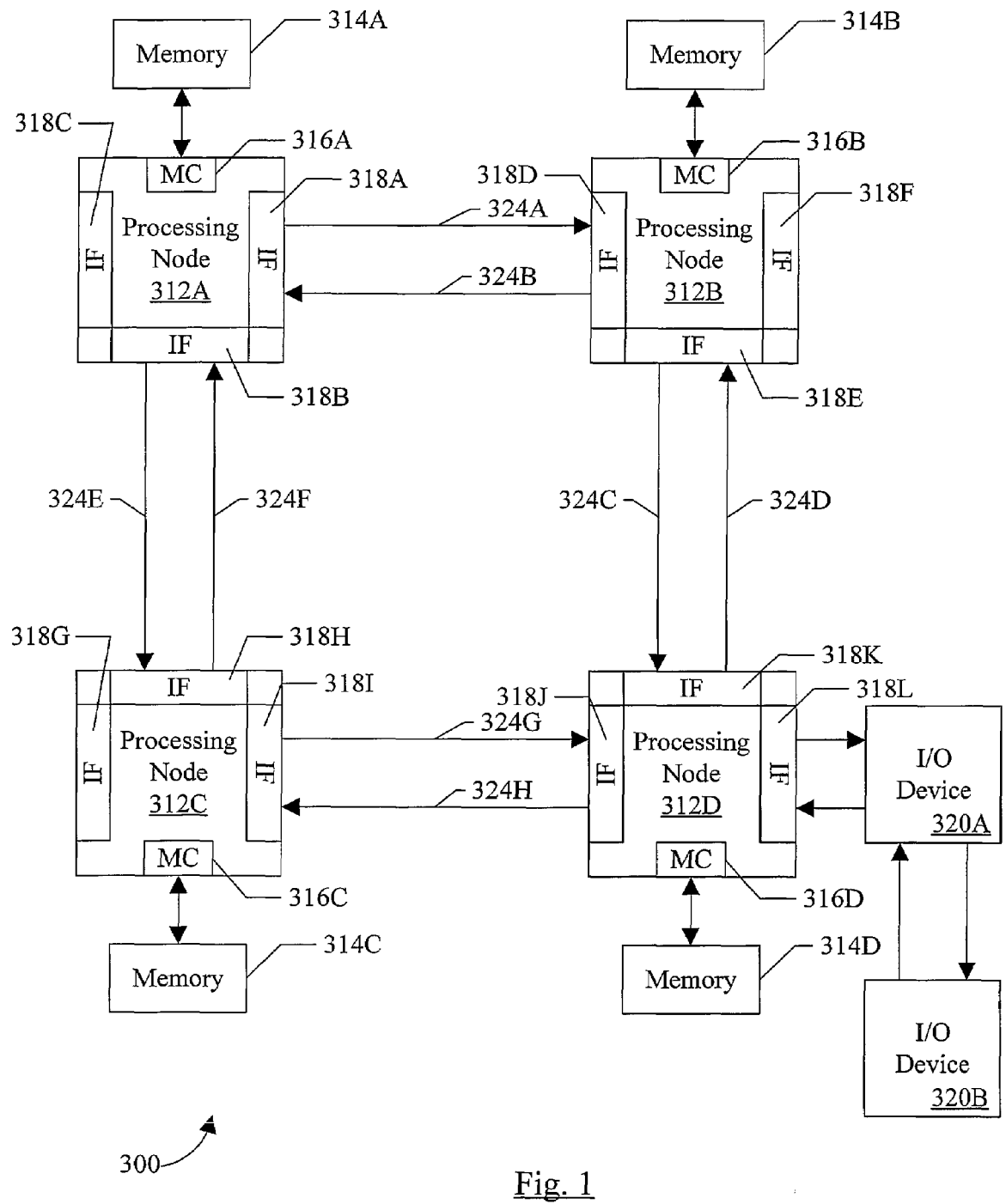
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, an embodiment of a computer system 300 is shown. In the embodiment of FIG. 1, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include an interface circuit to communicate between the processing nodes 312A-312D. For example, processing node 312A includes interface circuit 318A for communicating with processing node 312B, interface circuit 318B for communicating with processing node 312C, and interface circuit 318C for communicating with yet another processing node (not shown). Similarly, processing node 312B includes interface circuits 318D, 318E, and 318F; processing node 312C includes interface circuits 318G, 318H, and 318I; and processing node 312D includes interface circuits 318J, 318K, and 318L. Processing node 312D is coupled to communicate with a plurality of input/output devices (e.g. devices 320A-320B in a daisy chain configuration) via interface circuit 318L. Other processing nodes may communicate with other I/O devices in a similar fashion.

Processing nodes 312A-312D implement a packet-based interface for inter-processing node communication. In the present embodiment, the interface is implemented as sets of unidirectional links (e.g. links 324A are used to transmit packets from processing node 312A to processing node 312B and links 324B are used to transmit packets from processing node 312B to processing node 312A). Other sets of links 324C-324H are used to transmit packets between other processing nodes as illustrated in FIG. 1. Generally, each set of links 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 1. Any suitable routing algorithm may be used. Other embodiments of computer system 300 may include more or fewer processing nodes then the embodiment shown in FIG. 1.

Generally, the packets may be transmitted as one or more bit times on the links 324 between nodes. A given bit time may be referenced to the rising or falling edge of the clock signal on the corresponding clock lines. That is, both the rising and the falling edges may be used to transfer data, so that the data rate is double the clock frequency (double data rate, or DDR). The packets may include request packets for initiating transactions, probe packets for maintaining cache coherency, and response packets for responding to probes and requests (and for indicating completion by the source/target of a transaction). Some packets may indicate data movement, and the data being moved may be included in the data movement packets. For example, write requests include data. Probe responses with modified data and read responses both include data. Thus, in general, a packet may include a command portion defining the packet, its source and destination, etc. A packet may optionally include a data portion following the command portion. The data may be a cache block in size, for coherent cacheable operations, or may be smaller (e.g. for non-cacheable reads/writes). A block may be the unit of data for which coherence is maintained. That is, the block of data is treated as a unit for coherence purposes. Coherence state is maintained for the unit as a whole (and thus, if a byte is written in the block, then the entire block is considered modified, for example). A block may be a cache block, which is the unit of allocation or deallocation in the caches, or may differ in size from a cache block.

Processing nodes 312A-312D, in addition to a memory controller and interface logic, may include one or more processors. Broadly speaking, a processing node comprises at least one processor and may optionally include a memory controller for communicating with a memory and other logic as desired. One or more processors may comprise a chip multiprocessing (CMP) or chip multithreaded (CMT) integrated circuit in the processing node or forming the processing node, or the processing node may have any other desired internal structure. Any level of integration or any number of discrete components may form a node. Other types of nodes may include any desired circuitry and the circuitry for communicating on the links. For example, the I/O devices 320A-320B may be I/O nodes, in one embodiment. Generally, a node may be treated as a unit for coherence purposes. Thus, the coherence state in the coherence scheme may be maintained on a per-node basis. Within the node, the location of a given coherent copy of the block may be maintained in any desired fashion, and there may be more than one copy of the block (e.g. in multiple cache levels within the node).

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface circuits 318A-318L may comprise a variety of buffers for receiving packets from the link and for buffering packets to be transmitted upon the link. Computer system 300 may employ any suitable flow control mechanism for transmitting packets. For example, in one embodiment, each interface circuit 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

In one embodiment, the links 324A-324H are compatible with the HyperTransport™ (HT) specification promulgated by the HT consortium, specifically version 3. The protocol on the links is modified from the HT specification to support coherency on the links, as described above. For the remainder of this discussion, HT links will be used as an example (and the interface circuits 318A-318L may be referred to as HT ports). However, other embodiments may implement any links and any protocol thereon. Additionally, processing nodes may be used as an example of nodes participating in the cache coherence scheme (coherent nodes). However, any coherent nodes may be used in other embodiments.

It is noted that, while the present embodiment comprises packets transmitted between nodes, any form of communication may be used in various embodiments. Thus, a request packet may be simply a request; a probe packet may be simply a probe; a response packet may be simply a response; etc.

Figure 2:
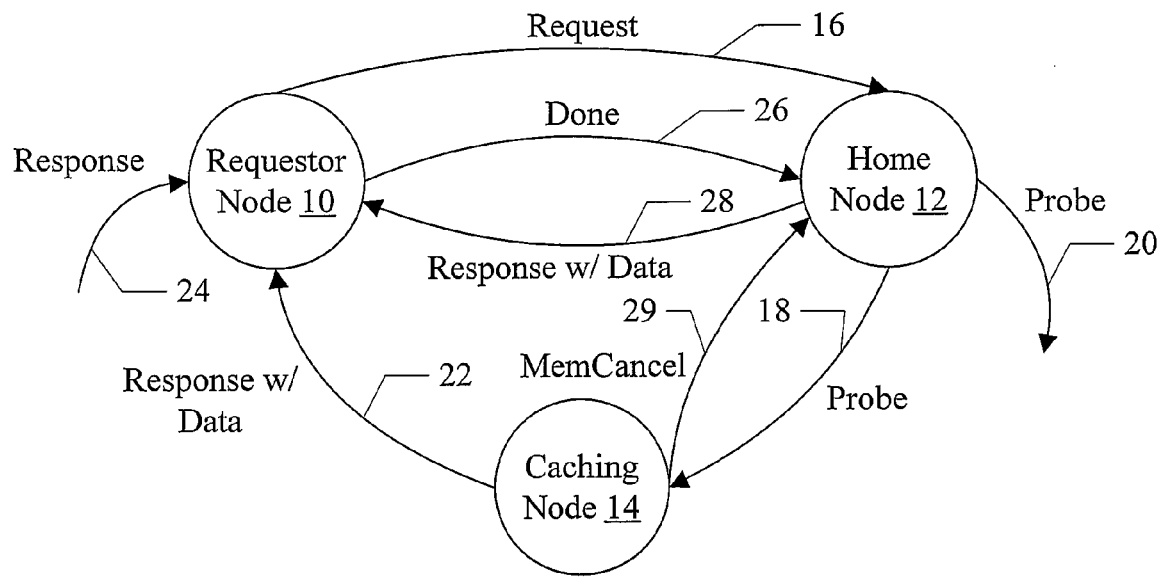
FIG. 2 is a block diagram of one embodiment of a "3 hop" coherence protocol.

Turning next to FIG. 2, a block diagram of one embodiment of nodes and packets transmitted between the nodes for a coherent transfer are shown. Particularly, a requester node 10, a home node 12, and a caching node 14 are shown. Each node 10, 12, and 14 may be any of the processing nodes 312A-312D for a given transaction, for example. The requester node 10 is the initiator of the transaction. That is, the requester node 10 may include at least one memory request source that generates memory requests (e.g. a processor, in one embodiment). The home node 12 is the home node of the block addressed by the memory request, and the caching node 14 is a node that has a coherent copy of the block cached (or may have a coherent copy cached).

The requester node 10 initiates a memory transaction by transmitting a memory request to the home node 12 (arrow 16). Generally, the memory request may include the address of the block, and may also include an indication of the type of request. In one embodiment, for example, memory requests may include a read shared request (used for a read cache miss) that requests at least a shared copy of the cache block; a read modify request (used for a cacheable write cache miss) that requests a modifiable copy of the cache block; an upgrade or change to dirty request (used for a cache write hit on a shared block) to obtain ownership of a block that is cached; a write block request to transfer a modified block back to the home (e.g. upon eviction of the modified block from a cache in a caching node); and read or write sized requests for non-cacheable read/writes.

The home node 12 receives the memory request, and orders the memory request with respect to other memory requests. That is, the home node is the coherence point for memory requests. The home node 12 selects the memory request for processing, and issues one or more probes to other nodes (arrows 18 and 20). In one embodiment, probes may be broadcast to each coherent node in the system. In other embodiments, the home node 12 may implement a directory scheme and may transmit probes only to those nodes that are caching the requested block. Generally, a probe is any communication that identifies a requested block and requests a state change for the block, if the node receiving the block has a copy of the requested block. The probe may also specify that the block be provided by the receiving node, for example if the receiving node has a modified or owned copy of the block.

The caching node 14 may have a modified, exclusive, or owned copy of the block, and may provide a probe response including the block data to the requestor node 10 (arrow 22). Other nodes may provide probe responses as well (arrow 24). The home node 12 may also provide a response with the data read from the memory (or from a cached copy, if the home node 12 is caching a more recent copy than is stored in the memory). The home node 12 may provide the data for non-directory systems, since it is not known whether or not another node will be providing the data. (arrow 28). Once the probe responses have been received, the requestor node 10 may provide a done response to the home node 12 to inform the home node 12 that the transaction is completed (arrow 26). In one embodiment, a memory cancel response may also be supported (arrow 29). The memory cancel response may be transmitted by a caching node (e.g. node 14) if the caching node is to respond to the probe with data. The memory cancel response is an optimization, and if it reaches the home node 12 before the home node 12 transmits the response with data (arrow 28), the home node 12 may not transmit the response.

While the above description mentions the caching node having a modified, exclusive, or owned copy, generally the caching node 14 may have the coherent copy in a state that permits the caching node 14 to supply the block to the requester node. For example, if the request is a read (without intent to modify), the caching node 14 may have the block in the modified, exclusive, or shared states (or owned state). If the request is a read with ownership needed or a write, the caching node 14 may have the block in modified or exclusive state (or the owned state).

The protocol illustrated in FIG. 2 is referred to as a "3 hop" protocol, because generally three internode communications are used to provided data (a request, a probe, and a probe response). Even in the case that the home node 12 provides the data, the protocol is still 3 hop because the probe responses could include data that is more recent than the data provided from the home node 12, and so the requesting node 10 may wait for the probe responses before using the data. Each internode communication adds latency to the memory requests.

Figure 3:
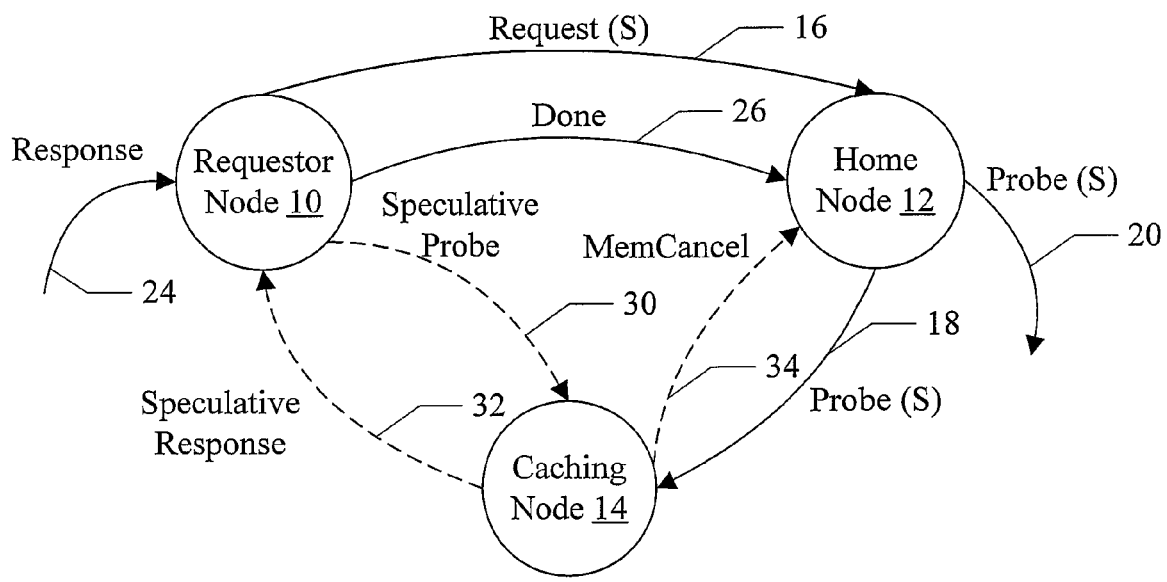
FIG. 3 is a block diagram of one embodiment of a speculative probe in the "3 hop" protocol shown in FIG. 2.

In one embodiment, an enhancement to the above 3 hop protocol is supported, shown in FIG. 3. The requester node 10 may be configured to predict which node is caching a copy of the requested block, and to transmit a speculative probe to the predicted node (caching node 14 in FIG. 3—arrow 30). The caching node 14 provides a speculative response to the speculative probe, including data if the prediction is correct and the caching node 14 has a copy of the data that can be provided in response to the memory request (arrow 32). If the prediction is incorrect, the caching node 14 may provide a speculative response indicating miss, in which case the transaction may be completed non-speculatively. If the speculation is correct, the latency of the memory request may be reduced to 2 hops instead of three.

The speculative probe and speculative probe response may be different commands than the "regular" non-speculative probe and response, so that a receiving node may distinguish between the speculative and non-speculative probes and responses. Otherwise, the probe and speculative probe may be similar, as may the probe response and speculative probe response. For example, in one embodiment, the probe may include the source node identifier (ID) identifying the requester node 10, a target node ID identifying the home node, the address of the block, an indication of the next state if a hit is detected in a receiving node for the probe, and an indication of whether data movement is desired if a hit is detected. The probe response may indicate whether or not data is being provided, and may also include the source node ID and the target node ID. The IS probe and probe response may also include a source tag to identify different transactions from the same requester node 10.

The non-speculative processing of the request is shown in FIG. 3 as well (similar to FIG. 2), including the requester node 10 transmitting the memory request (arrow 16), the probes being transmitted (arrows 18 and 20), the responses from other nodes (arrow 24). However, the caching node 14 may transmit the above-mentioned memory cancel response (MemCancel—arrow 34) in response to the probe in this case. The memory cancel response prevents the home node 12 from transmitting a response to the requester node 10 with the requested block (arrow 28 in FIG. 2), because the caching node 14 already provided the block. The memory cancel response is an optimization (preventing the unnecessary response from the home node and thus reducing bandwidth consumption) and need not be implemented. If the memory cancel response reaches the home node 12 prior to the home node 12 transmitting a read response with data to the requester node 10, the home node 12 may cancel transmission of the read response.

In one embodiment, each node may implement a remote hit predictor (shown in FIG. 4 and discussed in more detail below) to track certain blocks in order to make the prediction. If a given block is not represented in the requester node's remote hit predictor, then no prediction is made and the memory transaction may be performed non-speculatively, as shown in FIG. 2. If a block is represented in the requestor node's remote hit predictor, the prediction may be made. The caching node 14 may update its remote hit predictor in response to the speculative probe. However, other nodes would not necessarily be informed that the cache block is being predicted. In one embodiment, the requester node 10 may include an indication with the memory request that a speculative probe was transmitted (represented in FIG. 3 with the "S" in parentheses after the request). The indication may be provided in any fashion (e.g. a field in the memory request, such as a bit which is set to indicate the speculative probe was performed and clear to indicate that speculative probe was not performed). The home node 12 may pass the speculative indication on in the non-speculative probes (arrows 18 and 20), and receiving nodes may use the speculative indication as a hint that the block is being tracked and the receiving nodes may also update their remote hit predictors. Specifically, since the probes include the source ID identifying the requestor node 10 and the address of the block, the remote hit predictors may be updated to indicate that the requestor node 10 is to be predicted for the affected block. Thus, the prediction information may be propagated to nodes other than the requester node 10 and the caching node 14, which may improve the accuracy of the prediction in some embodiments. In some embodiments, a no-predict hint may be provided in a remote hit predictor entry to prevent a speculative probe in cases in which the speculative probe may not reduce the latency of the operation (e.g. cases in which the speculative probe would be send to the home node). In one such embodiment, the memory request may still include the speculative indication (and it may be passed on through the probes), so that other nodes may still update their remote hit predictor entries. Each node may thus update its entry in the same fashion described above, even though no speculative probe is sent.

In one embodiment, the requester node 10 may delay the memory request transmission to the home node until the speculative probe and response are complete. The requester node 10 may not perform the non-speculative processing for the memory request if the speculation is successful. Such an embodiment may be used if the remote hit predictors exhibit high accuracy, saving bandwidth by not performing the non-speculative portion of the transaction. In one implementation, delaying the memory request transmission may be a programmable mode, or may be performed on a transaction by transaction or block by block basis, depending on how accurate the prediction has been in the past for the particular transaction/block. In other embodiments, the requestor node 10 may transmit the memory request independent of transmission of the speculative probe (e.g. in parallel with the speculative probe, before or after the speculative probe, etc.).

It is noted that, if the memory request is not delayed until the speculative probe and response are complete, then a race exists between the speculative probe and the non-speculative probe in reaching the caching node 14. If the non-speculative probe arrives first, the caching node 14 may respond to the non-speculative probe as appropriate and may respond to the speculative probe with a probe miss.

It is also noted that there may be another request to the same block at the home node 12 before the request from the requester node 10. In such cases, there is a race between the speculative probe and the probe from the earlier request. The requester node 10 may handle such situations by retaining the speculatively-provided block until a packet from the non-speculative portion of the same request is received. For example, the requester node 10 may ensure that speculatively-provided block is not evicted from the cache until a packet from the non-speculative portion of the same request is received (or until a probe from a different request hits the block). Alternatively, a clean block may be allowed to be evicted, but a dirty block may be retained until the above conditions are met. In still other embodiments, it may be possible to evict any block and thus no retention may be needed. If another non-speculative probe (from another request) is received at the requester node 10 before the non-speculative portion of the requester node's request, the requester node 10 may relinquish ownership of the block to the earlier request. Additionally, if a speculative probe (from another request) collides with an SRQ entry, and either a non-speculative request to the same block or a speculative probe to the same block has already been transmitted from that SRQ entry, the node may cancel the speculative probe (e.g. respond with probe miss) for the colliding speculative probe. Such operation may reduce the collision cases to at most one speculative probe and a non-speculative operation to the same block.

Figures 4, 5:
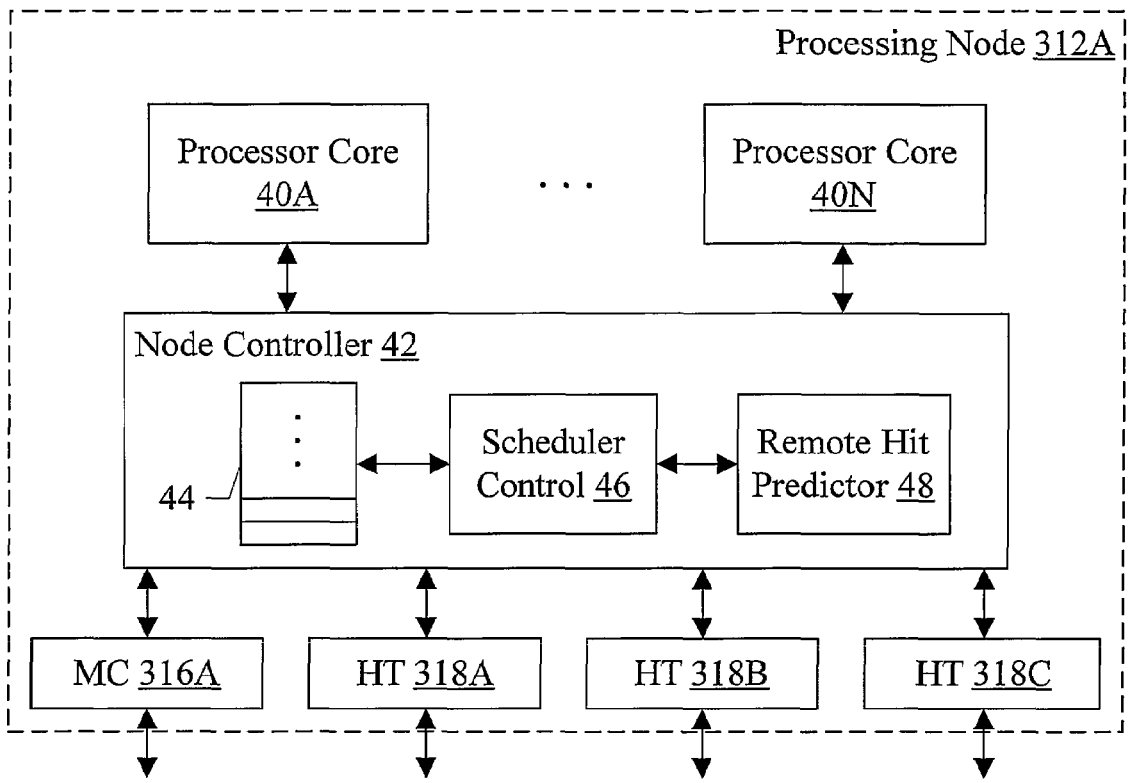
FIG. 4 is a block diagram of one embodiment of a node including a Remote Hit Predictor.
FIG. 5 is a block diagram of one embodiment of an remote hit predictor entry.

Turning now to FIG. 4, a block diagram of one embodiment of the processing node 312A is shown. Other processing nodes 312B-312D may be similar. In the embodiment of FIG. 4, the processing node 312A includes one or more processor cores 40A-40N coupled to a node controller 42 which is further coupled to the interface circuits 318A-318C (HT ports 318A-318C in this embodiment) and the memory controller 316A. The node controller 42 may comprise a system request queue (SRQ) 44, a scheduler control unit 46, and a remote hit predictor 48. The scheduler control unit 46 is coupled to the system request queue 44 and the remote hit predictor 48. In one embodiment, each the processing node 312A may be a single integrated circuit chip comprising the circuitry shown therein in FIG. 4. That is, the processing node 312A may be a chip multiprocessor (CMP). Other embodiments may implement the processing node 312A as two or more separate integrated circuits, as desired. Any level of integration or discrete components may be used.

The node controller 42 may generally be configured to receive communications from the processor cores 40A-40N, the memory controller 316A, and the HT ports 318A-318C and to route those communications to the processor cores 40A-40N, the HT ports 318A-318C, and the memory controller 316A dependent upon the communication type, the address in the communication, etc. The node controller 42 may write received communications into the SRQ 44 (from any source). Alternatively, data used for scheduling and routing may be written to the SRQ 44, and communications may be routed from source to destination within the node when scheduled. The node controller 42 (and more particularly the scheduler control unit 46) may schedule communications from the SRQ for routing to the destination or destinations among the processor cores 40A-40N, the HT ports 318A-318C, and the memory controller 316A.

Generally, the processor cores 40A-40N may use the interface to the node controller 42 to communicate with other components of the computer system 300. In one embodiment, communication on the interfaces between the node controller 42 and the processor cores 40A-40N may be in the form of packets similar to those used on the HT interfaces. In other embodiments, any desired communication may be used (e.g. transactions on a bus interface, packets of a different form, etc.). Similarly, communication between the memory controller 316A and the node controller 42 may be in the form of HT packets. Generally, the communications from the processor cores 40A-40N may include memory requests such as read operations and write operations, responses to probes forwarded by the node controller 42 (in response to scheduling the probes from the SRQ 44), etc. Particularly, the processor cores 40A-40N may be sources of memory requests in the node 312A. Other embodiments may have other sources in addition to, or instead of, the processor cores 40A-40N.

When the scheduler control unit 46 is otherwise ready to schedule a memory request sourced internal to the processor node 312A (from one of the processor cores 40A-40N, in this embodiment) for issue, the scheduler control unit 46 may check the remote hit predictor 48 for a prediction. If the remote hit predictor 48 has a prediction for the addressed block, the node controller 42 may issue the speculative probe in addition to (or instead of) the memory request, in various embodiments. Other embodiments may check the remote hit predictor 48 for a prediction at other times (e.g. at the time a memory request is written to the SRQ 44). Additionally, when the scheduler control unit 46 schedules a received speculative probe for processing, the scheduler control unit 46 may communicate with the remote hit predictor to allocate or update an entry to store a prediction for the block. The entry may be updated to predict the source node of the speculative probe. Alternatively, the entry may be allocated/updated when the speculative probe response is scheduled to be transmitted to the source node. In some such embodiments, an entry may be allocated only if a hit is detected for the speculative probe. Still further, entry allocation may be requested when scheduling non-speculative probes (particularly, non-speculative probes that include the speculative indication described above).

Generally, a processor core 40A-40N may comprise circuitry that is designed to execute instructions defined in a given instruction set architecture. That is, the processor core circuitry may be configured to fetch, decode, execute, and store results of the instructions defined in the instruction set architecture. The processor cores 40A-40N may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc.

FIG. 5 is a block diagram of one embodiment of an entry 50 that may be stored in the remote hit predictor 48. The remote hit predictor 48 may comprise a plurality of entries 50, in any storage organization. For example, the remote hit predictor 48 may be a fully associative structure (e.g. a content addressable memory (CAM) that compares on the tag field), a direct mapped structure indexed by the block address, a set associative structure indexed by the block address, etc.

The entry 50 includes a tag field (Tag[47:6] in FIG. 5). The tag may comprise the portion of the block address that excludes the offset bits within the block. Thus, in this embodiment, bits 5:0 are excluded and a block is 64 bytes. Other embodiments may employ larger or smaller blocks. If the entry 50 is part of an indexed structure, the bits used for the index may also be excluded from the tag field. In this embodiment, addresses are 48 bits, but larger or smaller addresses may be used in other embodiments.

The identifier field (ID in FIG. 5) may store an identifier that indicates the processing node that is predicted to have a coherent copy that can be transferred to the node in response to a memory request. The ID may be a node number assigned to the predicted processing node, for example.

In one embodiment, the tag field and the ID field may be sufficient information to predict a node for speculative probing. If a given block address is a hit on an entry, the ID field may be used as the target of the speculative probe. Additional fields for optional features may be provided, in some embodiments.

For example, a local field (Local in FIG. 5) may be used to track the location of a block within the node. That is, the local field may be used to distinguish between an entry that predicts a remote hit and one that predicts a local hit. For example, the local field may be a bit indicating local when set and remote when clear. If the local field indicates remote, the ID field may be interpreted as described above. If the local field indicates local, the ID field may be interpreted as an identifier within the node (e.g. a processor core ID). In some embodiments, the entry 50 in a requestor node may be invalidated in response to a hit and a correct prediction (or even in response to just the hit) because the block will now be residing in the requestor node. In other embodiments that implement the local field, the entry 50 that is hit by a memory request may be converted to a local node entry identifying the location of the block within the node. If another memory request source (e.g. another processor) within the node requests the block, the speculative probe and response may be completed within the node and the transaction may effectively be completed in zero hops. That is, the external request may be converted into a self-snoop within the node. If a subsequent probe causes the block to be transferred away from the node, the entry 50 may again be updated to indicate the remote node to which the block has been transferred.

The speculative sent field (Spec Sent in FIG. 5) may track whether or not the block has been speculatively transmitted to another node. For example, the speculative sent field may be a bit indicating speculative transmission when set and no speculative transmission when clear. The speculative sent field may be used, e.g., in the caching node to determine whether or not to transmit a memory cancel response to the home node when a non-speculative probe for the same transaction is received from the home node. If the speculative sent bit is set, the memory cancel response may be sent. If the speculative sent bit is clear, the memory cancel response may not be sent. Specifically, the speculative sent bit may protect against the transmission of a memory cancel response to the home node if a non-speculative probe from a different transaction arrives before the non-speculative probe from the same transaction as the speculative probe. In such a case, the non-speculative probe from the different transaction will not result in a memory cancel response and will clear the speculative sent bit to prevent the transmission of a memory cancel response for the non-speculative probe from the same transaction as well. Thus, each transaction will receive data from the home node.

The no predict field (No Predict in FIG. 5) may be used to prevent a prediction while retaining the entry. For example, the no predict field may be a bit indicating no prediction when set and predict when clear. There may be times at which no prediction is desired while still retaining the entry. For example, if the block is transferred to the home node of the block (e.g. due to a memory request from a processor in the home node), the non-speculative mechanism may provide data in two hops (one from the requester node to the home node, and the probe response from the home node to the requester node providing the data). In this case, the prediction may not result in latency reduction, and so the no predict bit may be set until the block is moved to another node besides the home node. Other embodiments may predict the home node as well, and transmit the speculative probe to the home node. While the no predict field may be used to prevent a speculative probe, the speculative hint indication may still be included in the non-speculative memory request (and propagated in the probes) as described previously.

Other fields are contemplated as well. For example, in embodiments in which the memory request transmission to the home node is delayed until the speculative probe and probe response is complete, a field may be provided to inhibit the delay if a misprediction is detected, until a pattern of correct predictions is detected for the entry.

Figure 6:
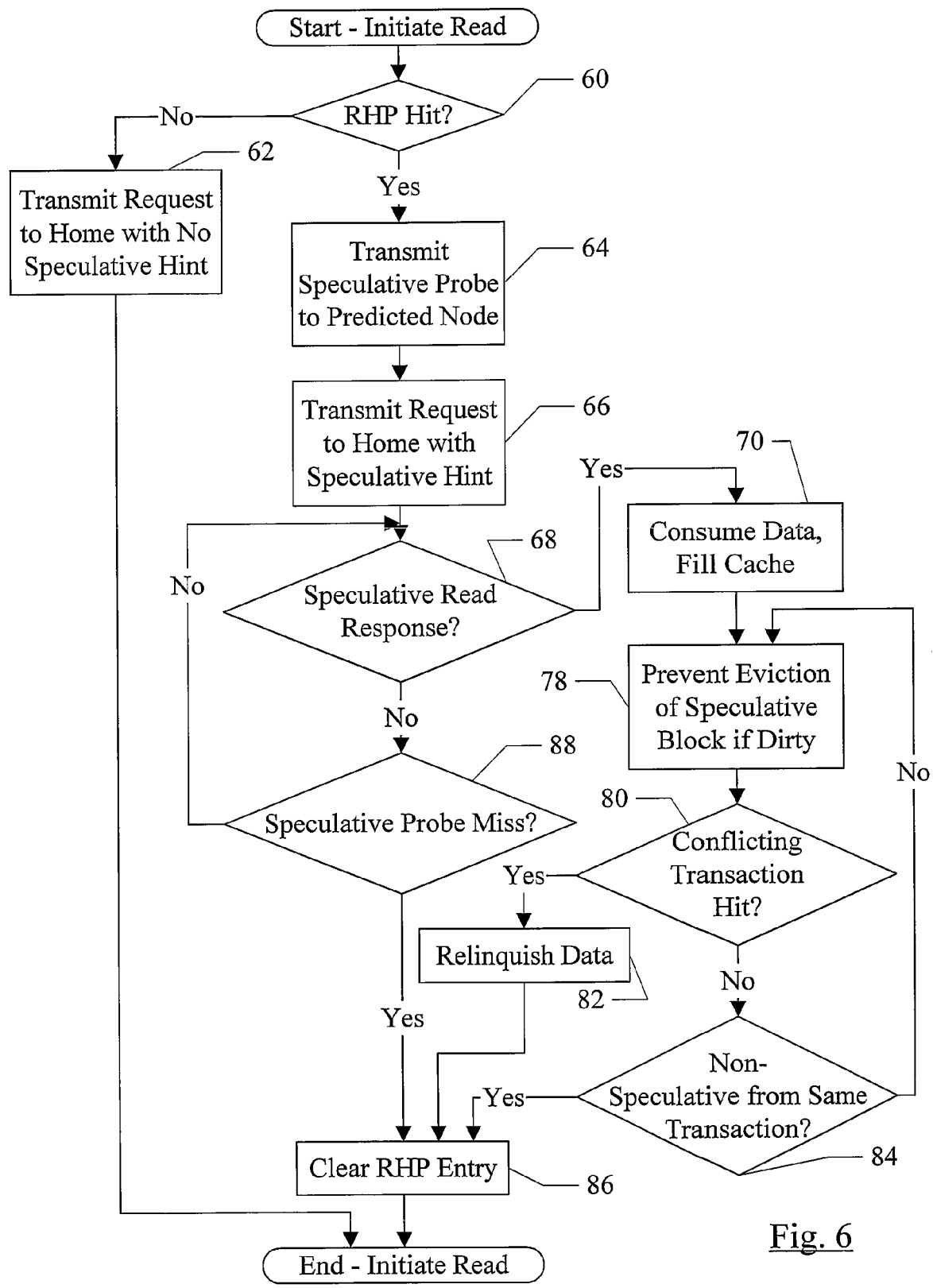
FIG. 6 is a flowchart illustrating operation of one embodiment of a node in response to a memory request generated by a local source.

Turning now to FIG. 6, a flow chart illustrating operation of one embodiment of the node controller 42 (and more particularly the scheduler control unit 46, in the embodiment shown in FIG. 4, although the node controller 42 will be referred to below for brevity) to initiate a read memory request. While the blocks are shown in a particular order, other orders may be used. Blocks may be performed in parallel in combinatorial logic in the node controller 42/scheduler control unit 46. Blocks, combinations of blocks, and/or the flow chart as a whole may be pipelined over multiple clock cycles.

The node controller 42 may check the remote hit predictor 48 for a hit by the memory request (decision block 60). The check may occur when the node controller 42 is otherwise ready to schedule the memory request. If the request is a miss in the remote hit predictor 48 (decision block 60, "no" leg) there is no prediction for the memory request and the node controller 42 may process the memory request non-speculatively. The node controller 42 may transmit the memory request (without the speculative hint indication) to the home node (block 62).

On the other hand, if there is a prediction in the remote hit predictor 48 (decision block 60, "yes" leg), the node controller 42 may transmit a speculative probe to the predicted node (block 64) and may transmit the request to the home node with the speculative hint indication (block 66). In one embodiment, the request is transmitted independent of the speculative probe (and vice versa). In other embodiments, as mentioned above, the memory request transmission to the home may be delayed until the speculative probe and response are completed. Whether or not to delay the memory request may depend on a "no request" bit in the entry, in some embodiments.

The node controller 42 may await the response to the speculative probe. Other SRQ 44 entries may be scheduled by the node controller 42 during the time that the speculative probe is outstanding. If the response is a speculative read response (providing data—decision block 68, "yes" leg), the node controller 42 may consume the data (e.g. forwarding to the requesting processor core 40A-40N) and fill the data into the cache (e.g. in the requesting processor core 40A-40N, into a level 2 or level 3 cache within the node, etc.) (block 70). The fill may be temporarily delayed, in some embodiments, and the data may be buffered until the fill is completed. The node controller may also prevent eviction of the speculative-provided block (at least if the block is dirty) until a conflicting transaction or a non-speculative portion of the same transaction is detected (block 78). Preventing the eviction may be implemented to detected a conflict between the speculative probe and an earlier conflicting transaction to the same block. The home node 12 may establish an order for transactions, including transactions to the same block, and an earlier transaction may have been ordered at the home node 12 prior to the transaction for which the speculative probe was issued. Preventing the eviction may be handled in a variety of ways. For example, the address of the block may be retained by the node controller 42, and may be compared against potential victim addresses. Alternatively, a bit in the cache tag could be added to indicate that the block should not be evicted, or any other mechanism may be implemented.

If, while eviction is being prevented, a hit on the same block is detected for a packet corresponding to a conflicting transaction (decision block 80, "yes" leg), the node controller 42 may relinquish the data in response to the transaction (block 82). Subsequently, the non-speculative portion of the transaction may complete and provide the data back to the node. Additionally, the node controller 42 may clear the entry in the remote hit predictor 48 (block 86).

If no hit by a conflicting transaction is detected (decision block 80, "no" leg) and any packet corresponding to the non-speculative portion of the transaction initiated by the node controller is detected (decision block 84, "yes" leg), the node controller 42 may cease monitoring the speculatively-provided block, as it is no longer speculative. Additionally, the node controller 42 may clear the remote hit predictor entry in the remote hit predictor 48 that corresponds to the block (block 86). Alternatively, the node controller 42 may update the remote hit predictor 48 entry to indicate local and may update the ID to identify the memory request source (e.g. one of the processor cores 40A-40N). If no hit by a conflicting transaction is detected (decision block 80, "no" leg) and no hit of a packet corresponding to the non-speculative portion of the transaction initiated by the node controller is detected (decision block 84, "no" leg), the node controller 42 may continue to block the eviction of the speculative-provided block (block 78).

If no speculative read response is received (decision block 68, "no" leg) but a speculative probe miss response is received (decision block 88, "yes" leg), the prediction was incorrect (or failed due to a collision with a non-speculative transaction or another speculative probe) and the node controller 42 may clear the remote hit predictor entry to prevent a subsequent prediction (block 86). Otherwise (decision blocks 68 and 88, "no" legs), the node controller 42 may continue to await a response to the speculative probe. Not shown in FIG. 6 is the case in which a non-speculative read response is received from the home node prior before the speculative read response. Such responses may be handled normally, and the caching node may eventually return a speculative probe miss response for the speculative probe.

Figure 7:
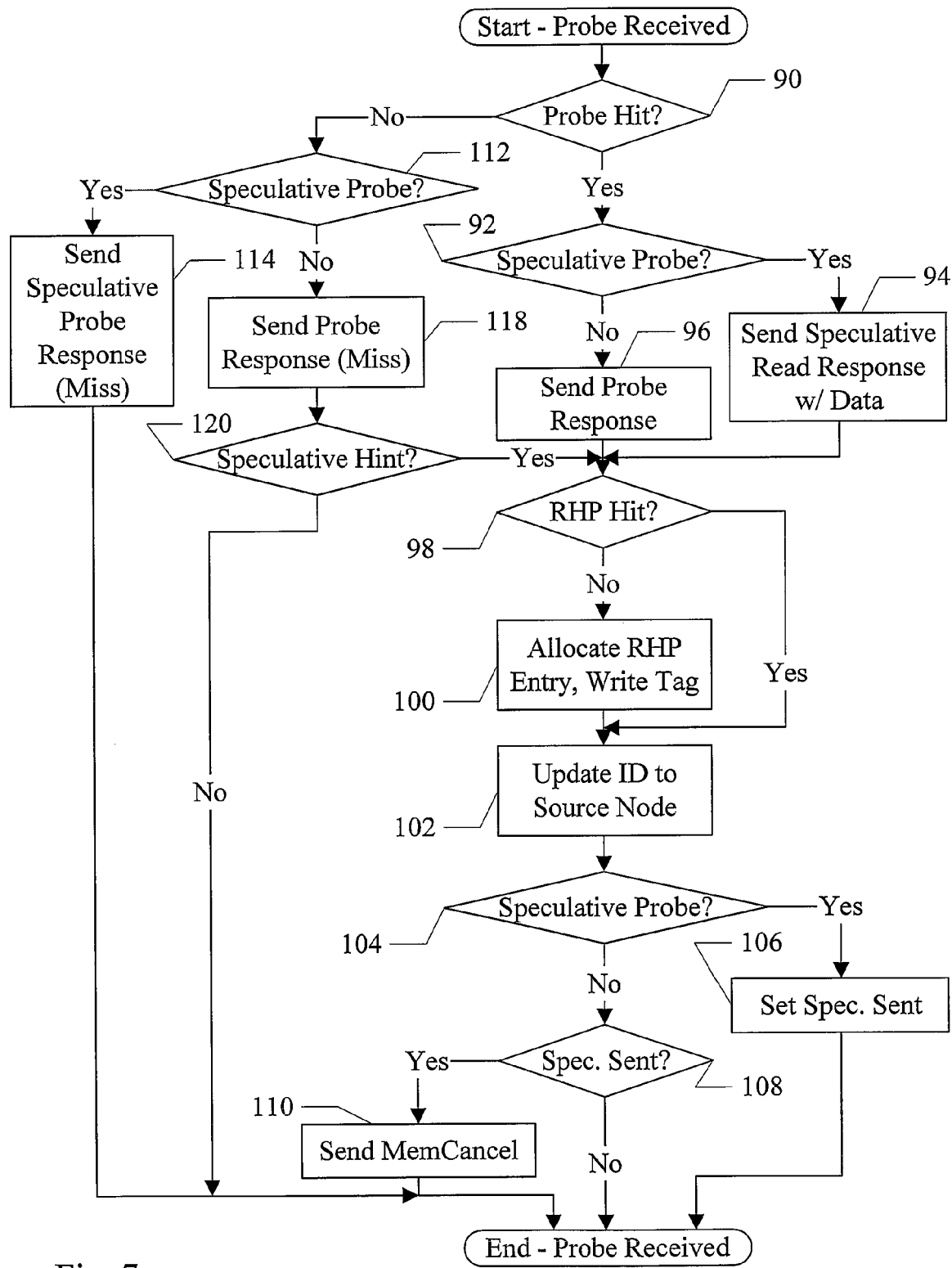
FIG. 7 is a flowchart illustrating operation of one embodiment of a node in response to receiving a probe.

Turning now to FIG. 7, a flow chart illustrating operation of one embodiment of the node controller 42 (and more particularly the scheduler control unit 46, in the embodiment shown in FIG. 4, although the node controller 42 will be referred to below for brevity) in response to a probe received by the node. While the blocks are shown in a particular order, other orders may be used. Blocks may be performed in parallel in combinatorial logic in the node controller 42/scheduler control unit 46. Blocks, combinations of blocks, and/or the flow chart as a whole may be pipelined over multiple clock cycles.

The probe may be written to the SRQ 44, like other communications, and the operation of the flowchart in FIG. 7 may be performed when the probe is scheduled for processing, in one embodiment. The node controller 42 may propagate the probe to the processor cores 40A-40N and any other caches, and may collect the probe results. If the probe is a hit in one or more caches (decision block 90, "yes" leg) and the probe is a speculative probe (decision block 92, "yes" leg), the node controller 42 may send a speculative read response to the requester node with the block of data (block 94). For this case, the speculative probe may need to hit the block with a cache state that permits the data to be provided. For example, if the read is a read shared or read block, the block may be provided in any valid state. If the read is a read to modify, the block may be provided if in the block is in the owned, exclusive, or modified states. If the probe is a hit (decision block 90, "yes" leg) and is a non-speculative probe (decision block 92, "no" leg), the node controller 42 may send a response (a probe response or a read response with data, as appropriate).

If the hitting probe is a miss in the remote hit predictor 48 (decision block 98, "no" leg), the node controller 42 may allocate a remote hit predictor entry and may write the tag for the block to the allocated entry (block 100). In one embodiment, the node controller 42 may only allocate the entry if the state of the block was modified or owned, or if the memory request is a write and the block is in any valid state. In another embodiment, the node controller 42 may allocate in the above circumstances and may also allocate for other hitting probes, if the allocation would not dislodge an entry created due to the above circumstances. The node controller 42 may also update the entry (hit or newly allocated) with the source node ID from the probe (which identifies the requester node 10—block 102).

If the hitting probe is a speculative probe (decision block 104, "yes" leg), the node controller 104 may set the speculative sent bit in the entry (block 106). If not (decision block 104, "yes" leg) and the speculative sent bit is set (decision block 108, "yes" leg), the node controller 42 may send a memory cancel response to the home node (block 110).

If the probe is a miss (decision block 90, "no" leg) and the probe is a speculative probe (decision block 112, "yes" leg), the node controller 42 may send a speculative probe response indicating miss to the requester node (block 1 14).

If the probe is a miss and non-speculative (decision blocks 90 and 112, "no" legs), the node controller 42 may transmit a probe response indicating miss (block 11 8). If the non-speculative probe included the speculative hint indication (decision block 120, "yes" leg), the node controller 42 may update/allocate an entry for the block (decision block 98 and blocks 100 and 102). The probe is non-speculative in this case (decision block 104).

Figure 8:
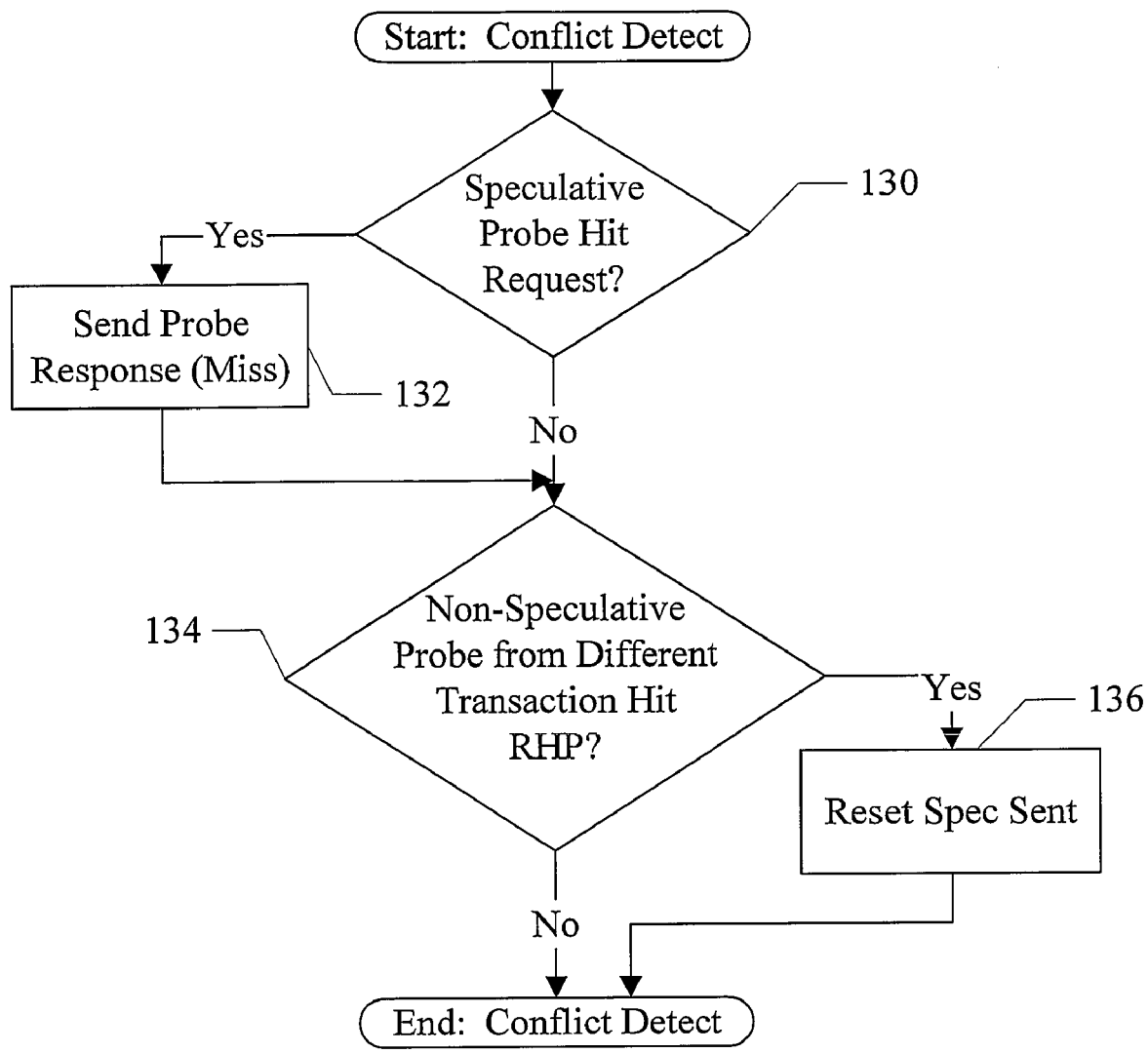
FIG. 8 is a flowchart illustrating operation of one embodiment of a node detecting conflicts.

Turning next to FIG. 8, a flow chart illustrating operation of one embodiment of the node controller 42 (and more particularly the scheduler control unit 46, in the embodiment shown in FIG. 4, although the node controller 42 will be referred to below for brevity) to detect and resolve conflicts (in addition to the data holding illustrating in FIG. 6). While the blocks are shown in a particular order, other orders may be used. Blocks may be performed in parallel in combinatorial logic in the node controller 42/scheduler control unit 46. Blocks, combinations of blocks, and/or the flow chart as a whole may be pipelined over multiple clock cycles.

If a speculative probe hits an SRQ entry allocated at the target of the probe, for the same block (decision block 130, "yes" leg), the node controller 42 may fail the speculative probe by sending a probe response indicating miss (block 132). This response may override any response that would be generated according to FIG. 7. If a non-speculative probe corresponding to a different transaction hits an entry in the remote hit predictor for which a speculative probe set the speculative sent bit (decision block 134, "yes" leg), the speculative sent bit may be reset (block 136). Thus, a memory cancel response to the home may be prevented in the case where the requestor node will have relinquished the data to a node that made a previous request for the block.

Numerous variations and modifications will become apparent to those skilled in the art once the above disclosure is fully appreciated. It is intended that the following claims be interpreted to embrace all such variations and modifications.

What is claimed is:

1. A method comprising:
  predicting a first node of a plurality of nodes coupled via an interconnect to have a coherent copy of a block addressed by a memory request, the predicting performed in a second node of the plurality of nodes that is initiating the memory request; and
  issuing a speculative probe from the second node to the first node.

2. The method as recited in claim 1 further comprising:
  receiving a response to the speculative probe in the second node; and completing the memory request non-speculatively if the response indicates a miss in the first node.

3. The method as recited in claim 1 further comprising:
issuing the memory request from the second node to a home node of the block;
issuing one or more probes from the home node in response to the memory request; and
receiving one or more responses, wherein at least one response comprises the block.

4. The method as recited in claim 3 further comprising receiving a speculative probe response from the first node in the second node, wherein issuing the memory request to the home node is delayed until the speculative probe response is received.

5. The method as recited in claim 3 wherein issuing the memory request is independent of issuing the speculative probe.

6. The method as recited in claim 3 wherein issuing the memory request comprises including an indication that the speculative probe was issued, and wherein issuing the one or more probes comprises including the indication, and the method further comprises updating additional remote hit predictors in one or more probed nodes that receive the one or more probes to predict the second node for the block.

7. The method as recited in claim 3 further comprising:
detecting the block in the first node responsive to the speculative probe;
responding to the speculative probe by providing the block to the second node;
receiving one of the one or more probes from the home node; and
responding to the one of the one or more probes with a memory cancel message to the home node in an attempt to prevent the home node from responding with the block.

8. The method as recited in claim 1 further comprising:
detecting the block in the first node responsive to the speculative probe;
updating a remote hit predictor in the first node to predict the second node.

9. The method as recited in claim 1 further comprising:
receiving a speculative probe response from the first node in the second node, wherein the speculative probe response provides the block; and
not issuing the memory request to a home node of the block in response to the speculative probe response.

10. The method as recited in claim 1 further comprising:
receiving a response to the speculative probe from the first node, the response including the block;
determining, in the second node, that a subsequent memory request to the block will not result in a latency reduction for the subsequent memory request if a speculative probe were issued, and associating a no-predict hint with the prediction for the block in response to the determining;
initiating a second memory request to the block from the second node;
detecting the prediction and the no-predict hint;
not issuing a speculative probe in response to the no-predict hint; and
issuing the second memory request non-speculative, and including a speculative indication in the non-speculative memory request to cause other nodes to associate a prediction with the block.

11. The method as recited in claim 1 further comprising:
selecting a second memory request to be issued from the second node, wherein the second memory request addresses a second block;
detecting a no-predict indication associated with a prediction for the second block in the second node; and
inhibiting issuance of a speculative probe for the second block responsive to the no-predict indication.

12. The method as recited in claim 1 further comprising ensuring that the block is retained in the second node until detecting at least one of: a non-speculative probe corresponding to a previous memory request to the block, or any non-speculative communication corresponding to the memory request.

13. The method as recited in claim 12, further comprising relinquishing the block to a requesting node that issued the previous memory request in response to detecting the non-speculative probe before the non-speculative communication.

14. The method as recited in claim 1 further comprising the first node detecting a conflict between the speculative probe and a previous request to the block; and returning a speculative probe miss in response to the conflict.

15. A first node comprising:
at least one memory request source; and
a node controller coupled to the at least one memory request source, wherein the node controller comprises a remote hit predictor configured to predict a second node to have a coherent copy of a block addressed by a memory request generated by the memory request source, wherein the node controller is configured to issue a speculative probe to the second node responsive to the prediction and to the memory request.

16. The first node as recited in claim 15 wherein the at least one memory source comprises a processor.

17. The first node as recited in claim 15 wherein the node controller is further configured to receive a response to the speculative probe, and to complete the first memory request non-speculatively if the response indicates a miss in the second node.

18. The first node as recited in claim 15 wherein the node controller is further configured to issue the memory request to a home node of the block, wherein the node controller is configured to delay issuing the memory request until a speculative probe response is received from the second node.

19. The first node as recited in claim 15 wherein the node controller is further configured to issue the memory request to the home node independent of issuing the speculative probe.

20. The first node as recited in claim 15 wherein the node controller is further configured to issue the memory request to the home node, including an indication that the speculative probe was issued.

21. The first node as recited in claim 15 wherein the node controller is further configured, in response to receiving a second speculative probe for a second block from a third node, to detect the second block in the first node and to update the remote hit predictor in the first node to predict the third node.

22. The first node as recited in claim 15 wherein the node controller is configured to access to the remote hit predictor for a prediction responsive to scheduling the memory request to be issued.

23. A system comprising a plurality of nodes coupled via an interconnect, wherein each of the plurality of nodes comprises a remote hit predictor, and a given node of the plurality of nodes, in response to a memory request to be issued from the given node, is configured to predict another node of the plurality of nodes to have a coherent copy of a block addressed by the memory request and is configured to issue a speculative probe to the other node in response to the prediction.

24. The system as recited in claim 23 wherein the given node is further configured to issue the memory request to a home node of the block, and wherein the given node is configured to include an indication in the memory request that the speculative probe was sent.

25. The system as recited in claim 23 wherein the home node is configured to issue one or more probes in response to the memory request, and to include the indication in the one or more probes, and wherein each probed node of the plurality of nodes is configured to update its remote hit predictor to predict the given node for the block in response to receiving the probe.

* * * * *